United States Patent [19]

Nicholas et al.

[11] Patent Number: 4,471,026
[45] Date of Patent: Sep. 11, 1984

[54] TERNARY ALLOYS IN BRAZING CERAMICS

[75] Inventors: Michael G. Nicholas, Wantage; Thomas M. Valentine, Wallingford, both of England

[73] Assignee: United Kingdom Atomic Energy Authority, England

[21] Appl. No.: 438,970

[22] Filed: Nov. 3, 1982

Related U.S. Application Data

[63] Continuation of Ser. No. 214,104, Dec. 8, 1980, abandoned.

[30] Foreign Application Priority Data

Dec. 14, 1979 [GB] United Kingdom ............... 7943260

[51] Int. Cl.³ .................... B32B 15/04; C22C 9/02; B44D 1/16
[52] U.S. Cl. .................... 428/450; 428/472; 228/263.12; 228/122; 228/121; 420/473; 420/474
[58] Field of Search ............... 428/450, 472; 420/473, 420/474; 228/263.12, 122, 121

[56] References Cited

U.S. PATENT DOCUMENTS 3,619,233 11/1971 Hipp et al. .................. 428/450 X
3,666,429 5/1972 Campbell, Jr. et al. ........ 428/472 X
4,009,027 2/1977 Naidich et al. ............... 420/473

*Primary Examiner*—Patricia C. Ives
*Attorney, Agent, or Firm*—Larson and Taylor

[57] ABSTRACT

The invention relates to the use of ternary alloys in brazing ceramics.

Brazing is a process of limited usefulness in the fabrication of ceramic components because of the inability of many alloys to wet industrially important ceramics. A possible solution is the metallizing of ceramics but this has technical and economic disadvantages. Alloys are known which wet ceramics but they do not necessarily give good bond strength. The following alloys have now been devised which both wet ceramics and give good bond strength, e.g., greater than 40 MNm$^{-2}$ at room temperature, with unmetallized ceramics. The alloys are:

Cu: 16 to 28 Ti: 6.5 to 14 Sn
Cu: 15 to 25 Ti: 10 to 25 Au
Cu: 15 to 50 Ti: 3 to 10 Ag
Cu: 25 to 35 Ti: 3 to 8 In wherein the compositions are in atom percent.

9 Claims, 4 Drawing Figures

TERNARY ALLOYS IN BRAZING CERAMICS

This is a continuation of application Ser. No. 214,104 filed Dec. 8, 1980, now abandoned.

This invention relates to the use of ternary alloys in brazing.

Brazing is used extensively in the fabrication of metallic components. It is, however, of limited usefulness in the fabrication of ceramic components because of the inability of many alloys to wet industrially important ceramics, such as oxides, carbides or carbon. A solution to this problem is to coat the surface of the ceramic with a metal layer before brazing. This solution suffers from technical and economic disadvantages and interest has therefore developed in the identification of brazes which can be used with unmetallised ceramics. Certain ternary alloys have been found capable of wetting ceramic substrates as determined by the sessile drop technique as discussed, for example, in Journal of Materials Science 13 (1978) 1509–1514. The fact than an alloys wets a ceramic substrate is not in itself sufficient to ensure its success as a braze since the strength of the resulting bond is also of importance. We have now devised ternary alloys which have been found to exhibit both good wetting and good bonding behaviour in respect of ceramic substrates.

Thus the present invention provides in a first aspect an artefact comprising a ceramic material bonded to a second material by means of a ternary alloy braze of Cu with Ti and either Sn, Au, Ag or In wherein the composition of the alloy in atom percent is in the range Cu: 16 to 28 Ti: 6.5 to 14 Sn; or Cu: 15 to 25 Ti: 10 to 25 Au; or Cu: 15 to 50 Ti: 3 to 10 Ag; or Cu: 25 to 35 Ti: 3 to 8 In.

In a second aspect the invention provides a method of bonding a ceramic material to a second material which comprises brazing the ceramic material to the second material by means of a ternary alloy of Cu with Ti and either Sn, Au, Ag or In wherein the composition of the alloy in atom percent is in the range Cu: 16 to 28 Ti: 6.5 to 14 Sn; or Cu: 15 to 25 Ti: 10 to 25 Au; or Cu: 15 to 50 Ti: 3 to 10 Ag; or Cu: 25 to 35 Ti: 3 to 8 In.

We have found that the ternary alloys used in the present invention exhibit good wetting behaviour on ceramic material as evidenced by sessile drop technique tests carried out on alumina and produce bonds having good room temperature tensile strength, for example when used to braze alumina where tensile strengths of the ceramic-braze interface in excess of 40 MNm$^{-2}$ have, in certain cases, been obtained.

Preferably, the second material is of ceramic which may be the same or different from the ceramic material. It is also preferred that the ceramic material and the second material, when a ceramic, are used unmetallised in the practice of this invention.

Examples of ceramic materials and/or second materials, when a ceramic, are refractory oxides such as and $Al_2O_3$, $MgO$, $ZrO_2$, $Y_2O_3$, $SiO_2$, $TiO_2$ and $HfO_2$ and mixtures of such refractory oxides of various compositions such as $Al_2O_3$ and $SiO_2$; diamond; graphite; silicon nitride; and silicon carbide. A particularly noteworthy example of silicon carbide is self-bonded silicon carbide which is made by siliconising a compact formed from a mixture consisting predominantly of powdered silicon carbide, carbon and usually (but not necessarily) a binding agent to give an impermeable product. Subsequent removal of free silicon gives rise to a porous self-bonded silicon carbide.

It should be noted that we do not wish to imply that every ternary alloy within our invention can necessarily be used to bond every ceramic material and second material. Clearly, particularly combinations of ternary alloy and material will be much more successful than others in this respect and some experimentation will, in practice, be required to identify such combinations.

The ternary alloys used may be prepared by methods known in the art; also the method of brazing may be carried out as known in the art.

The invention will now be particularly described, by way of example only as follows. All alloy compositions are in atom percent.

Reference will be made to the accompanying drawings wherein

PREPARATION OF ALLOYS AND TESTS THEREON

First Method

Figure 1:
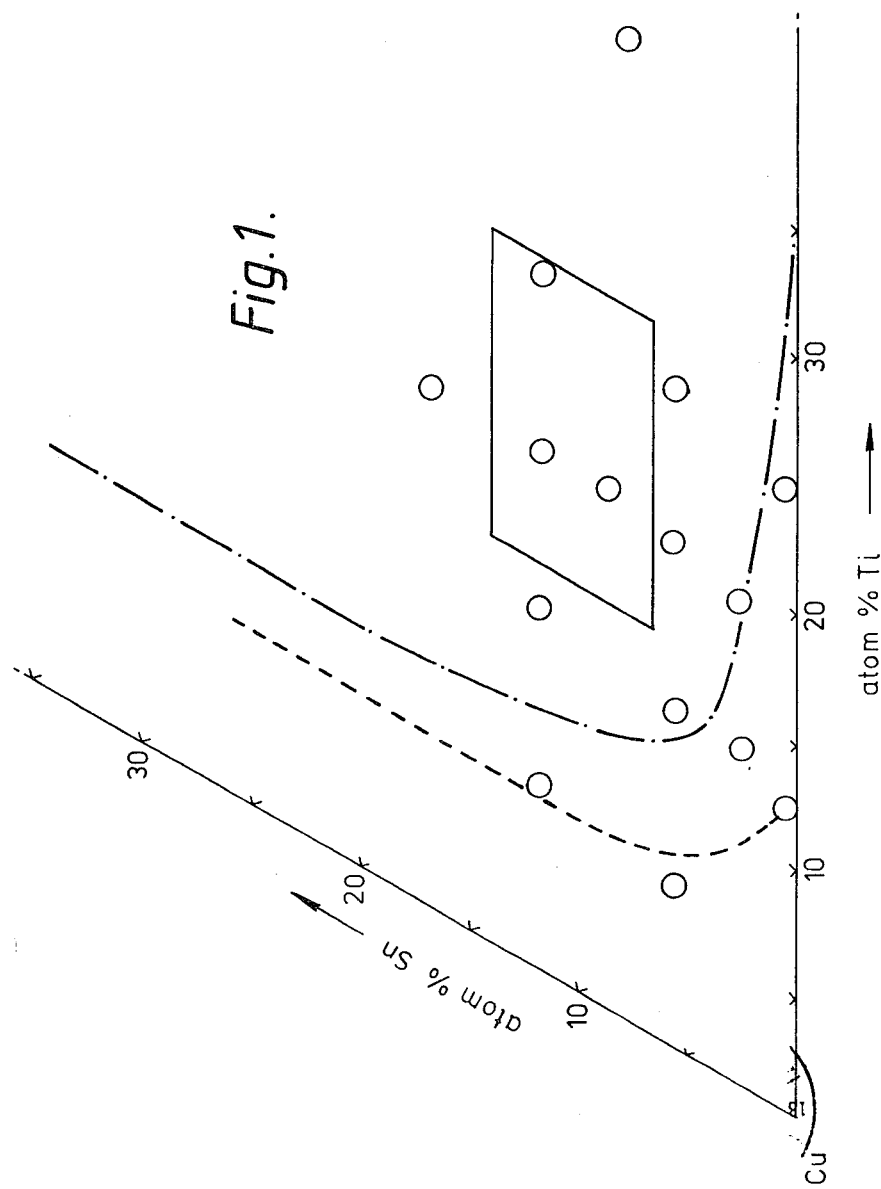
FIG. 1 is a ternary diagram of the system Cu—Sn—Ti.

Lengths of high purity, but not necessarily spectroscopically pure, wires of the three components of the desired ternary alloy were plaited to form a rope of the desired composition. The rope was formed into a circlet, placed between ASTM ceramic test pieces (ASTM designation F19-64) of alumina—3% silica and ultrasonically cleaned in acetone. ASTM is the American Society for Testing and Materials and F19 is a fixed designation of a Standard Method for tension and vacuum testing metalized ceramic seals. 64 indicates the year of original adoption as a standard, i.e. 1964, or in, the case of revision, the year of last revision.

The circlet and test pieces assembly was then placed in a vacuum chamber and the pressure reduced to 3 to $5 \times 10^{-5}$ torr. Power was supplied to a heating element to raise the temperature of the assembly slowly to 700° C. thereby outgassing it. The temperature was then raised rapidly to 1050° C. and held for 20 minutes. Under these conditions, an alloy of the three components was formed which bonded the test pieces together.

The strength of the resulting bond was measured by means of a jig as specified in F19-64. The jig was pulled in tension at room temperature in an "Instrom" machine made at a rate of 2 mm/minute. The fracture load was determined from the maximum value of the load-extension curve generated by the "Instrom" instrumentation.

Second Method

A cylinder of copper (3 mm diameter; 6 mm high) was machined with a deep hole in the top face, into which the required proportions of alloying elements were placed. The cylinder was placed on a 99.5% pure, silica free, AL 23 alumina disc (ex Degussa, Frankfurt am Main) and then placed in a vacuum furnace. Both the cylinder and disc had previously been cleaned ultrasonically in acetone.

The temperature of the furnace was then raised to 1050° C. in order to melt the metallic consitutents. The shape of the resulting molten drop was studied; this characterises wetting behaviour as described in the aforementioned Journal of Materials Science 13 (1978) 1509-1514 reference. Thus, wetting behaviour is measured in terms of the contact angle ($\theta$) subtended between the peripheral surface of a small sessile drop of the molten alloy and the horizontal surface of the alumina substrate. The contact angle ($\theta$) was measured using photographic means. The drop was allowed to solidify and the strength of the solidified alloy/alumina interface investigated as a guide to bond strength.

Third Method

ASTM ceramic test pieces (ASTM designation F19-64) were bonded by interposing therebetween sheets of the three components of the desired ternary alloy and in appropriate proportions followed by heating in a vacuum furnace. The results obtained were similar to those obtained in the first method.

A fourth method which can be used is to interpose powder of the three components of the desired ternary alloy and in appropriate proportions between the test pieces followed by heating and fifth method is to interpose a powder of the actual alloy followed by heating.

Figure 2:
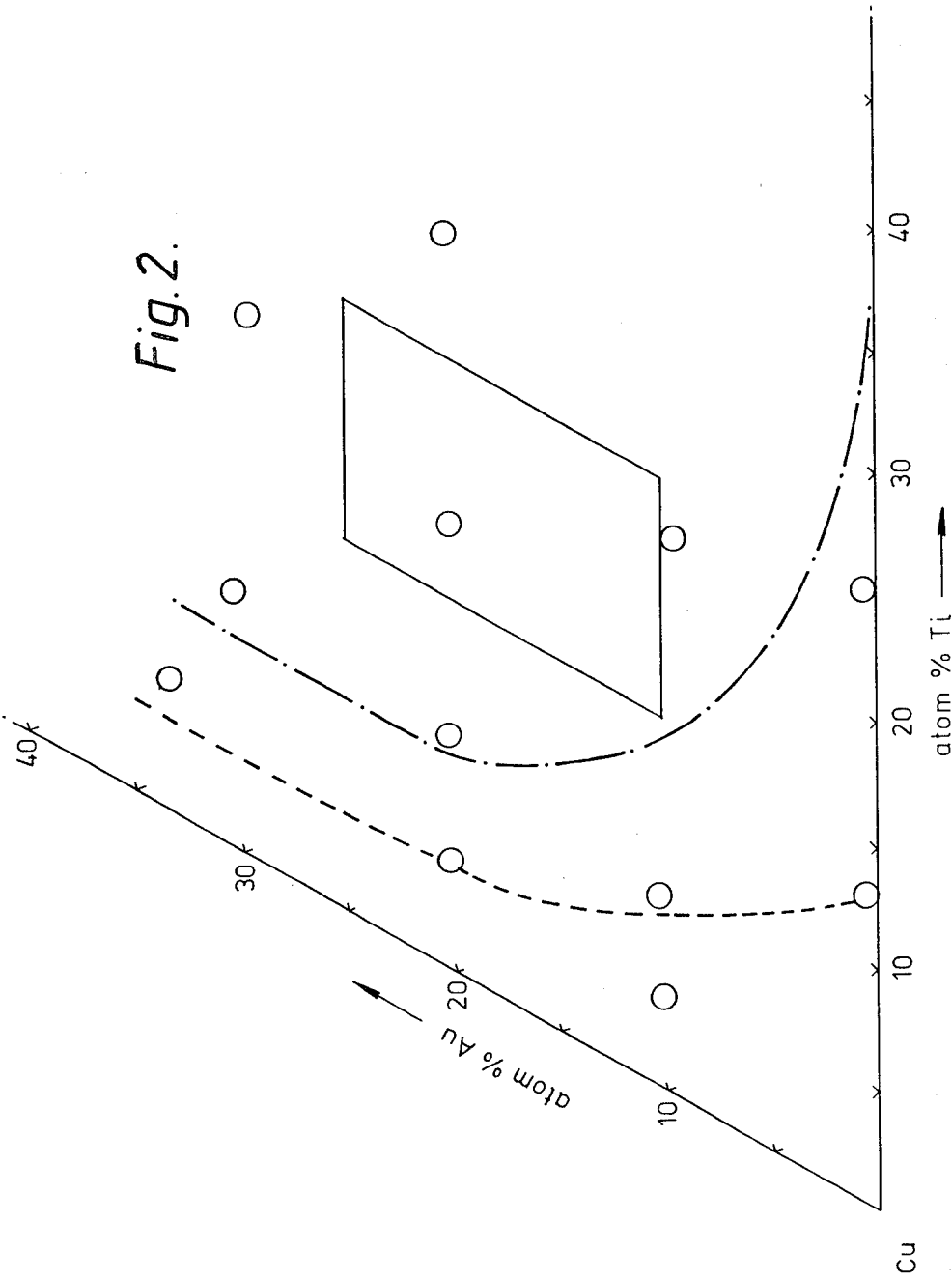
FIG. 2 is a ternary diagram of the system Cu—Au—Ti.
Figure 3:
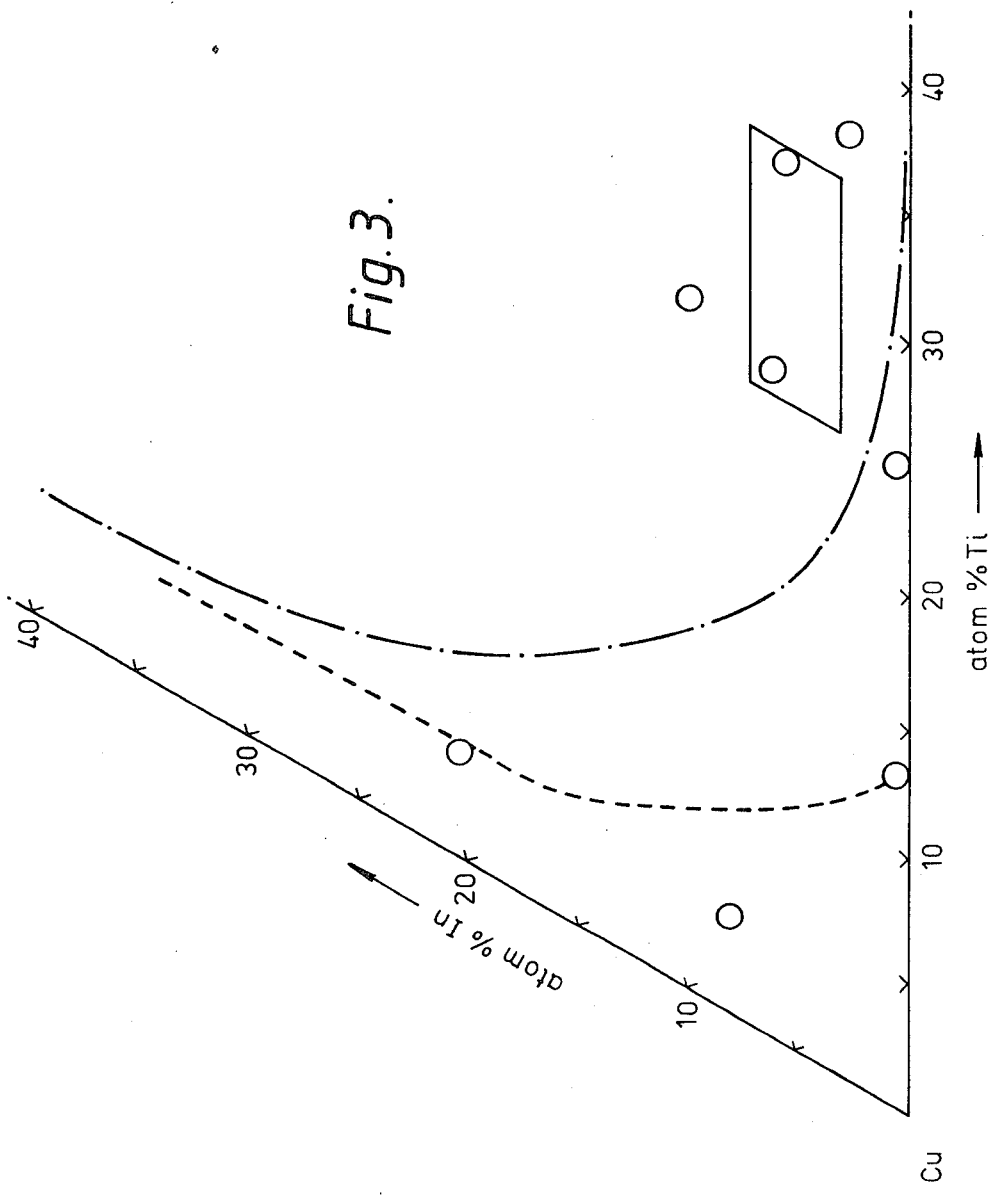
FIG. 3 is a ternary diagram of the system Cu—In—Ti.
Figure 4:
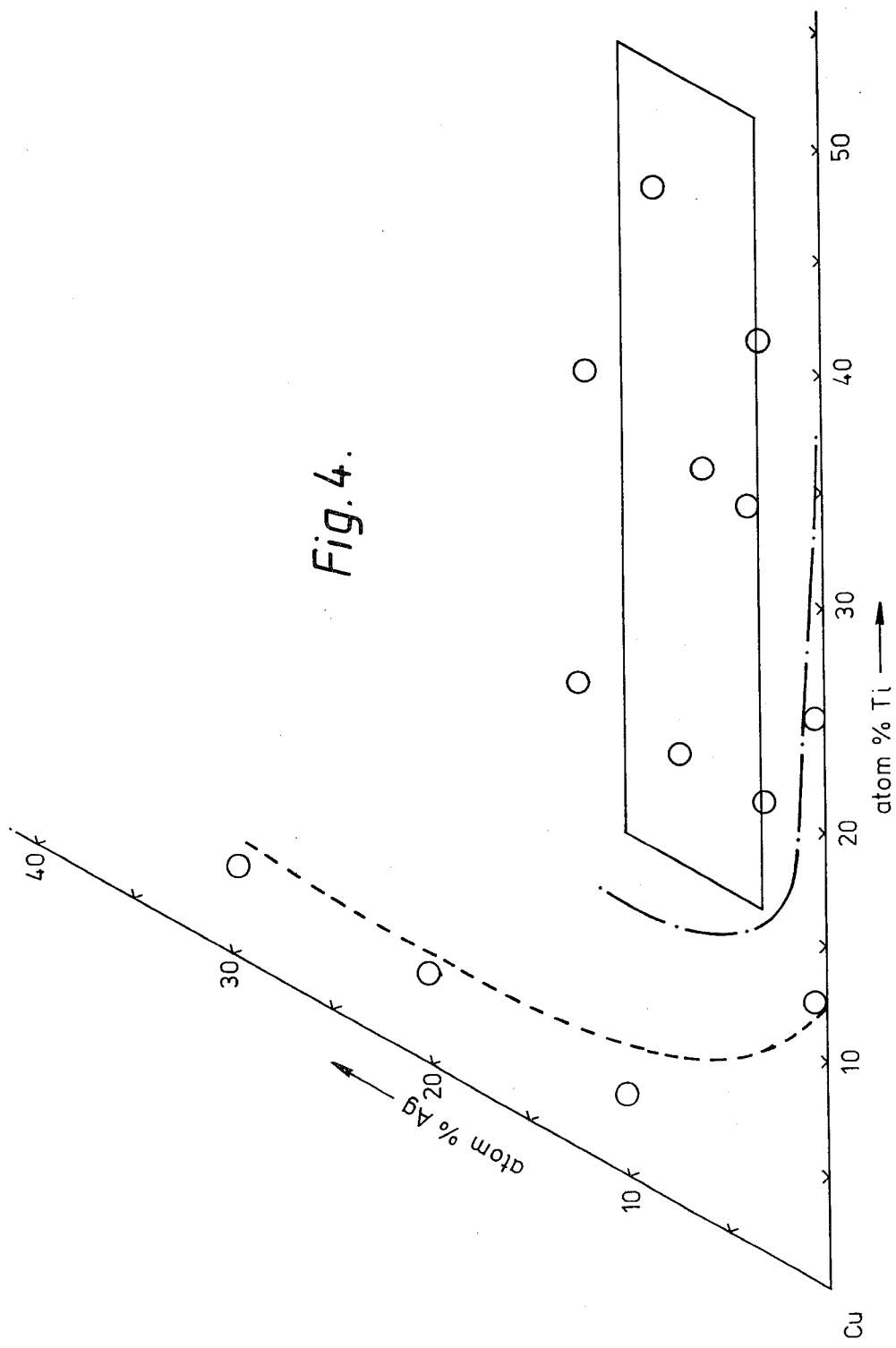
FIG. 4 is a ternary diagram of the system Cu—Ag—Ti.

The results of the above tests are summarised in FIGS. 1 to 4 to which reference is now made. Each figure shows the results of the wetting tests and the bond tests for the stated ternary system. In each figure the following obtains: the regular dotted line indicates the demarcation between non-wetting and wetting in that alloys to the right of this line gave a contact angle ($\theta$) of 90° or less (i.e. wetting) and those to the left of the line gave a contact angle of greater than 90°. The intermittent dotted line indicates the demarcation between wetting and very good wetting in that alloys to the right of this line gave a contact angle ($\theta$) of 10° or less (i.e. very good wetting). The area bounded by the continuous line indicates alloys which gave bond strengths of greater than 40 MNm$^{-2}$ and are the alloys used in the present invention. Specific examples of alloys are indicated by small circles.

The following alloys are preferred and gave the stated bond strengths in the above tests.

| Alloy | Bond Strength (MNn$^{-2}$) |
|---|---|
| Cu:8Sn:20Ti | 52 |
| Cu:10Au:20Ti | 49 |
| Cu:7Ag:32Ti | 62 |
| Cu:6In:27Ti | 57 |

By way of comparison and not as an example of this invention, a similar test was carried out on the previously developed, commercially available alloy Cu: 50.7 Ag: 15.8 Ti. This gave a bond strength of 32 MNm$^{-2}$. We also carried out comparative tests with Cu: 13 Ti and Cu: 25 Ti as described above and obtained bond strength of 11 and 12 MNm$^{-2}$ respectively. In a further comparative test we used test pieces of 99.5% alumina and formed bonds with solidified drops of Cu: 10 Ti that had a tensile strength of ~10 MNm$^{-2}$.

The abovementioned preferred alloys were each tested on samples of self-bonded silicon carbide by heating the alloys at 1050° C. for 1 minute in order to melt the alloy and applying the molten alloy to the silicon carbide sample. The alloys were allowed to cool to room temperature and in each case they were observed to have wetted the silicon carbide samples and to have adhered very strongly to the samples.

We claim:

1. An artefact comprising an unmetallized ceramic material bonded to a second material by means of a ternary alloy braze of Cu with Ti and either Au, Ag or In wherein the composition of the alloy in atom percent is in the range Cu: 15 to 25 Ti: 10 to 25 Au; or Cu: 15 to 50 Ti: 3 to 10 Ag; or Cu: 25 to 35 Ti: 3 to 8 In.

2. An artefact according to claim 1 wherein the ceramic material is silicon carbide.

3. An artefact according to claim 2 wherein the silicon carbide is self bonded silicon carbide.

4. An artefact according to claim 3 wherein the second material is self-bonded silicon carbide.

5. A method of bonding an unmetallized ceramic material to a second material which comprises brazing the ceramic material to the second material by means of a ternary alloy of Cu with Ti and either Au, Ag or In wherein the composition of the alloy in atom percent is in the range Cu: 15 to 25 Ti: 10 to 25 Au; or Cu: 15 to 50 Ti: 3 to 10 Ag; or Cu: 25 to 35 Ti: 3 to 8 In.

6. A method according to claim 5 wherein the second material is an unmetallized ceramic material.

7. A method according to claim 5 wherein the ceramic material is silicon carbide.

8. A method according to claim 7 wherein the silicon carbide is self bonded silicon carbide.

9. A method according to claim 6 wherein each ceramic material is self bonded silicon carbide.

* * * * *